United States Patent
Biermann et al.

(10) Patent No.: US 8,254,427 B2
(45) Date of Patent: Aug. 28, 2012

(54) DEVICE FOR CONTROLLING AN ARC FURNACE INSTALLATION

(75) Inventors: Martin Biermann, Möhrendorf (DE);
Arno Döbbeler, Herzogenaurach (DE);
Thomas Matschullat, Eckental (DE);
Johannes Scharf, Strullendorf (DE);
Gerd Schelbert, Hemhofen (DE); Uwe Stürmer, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 379 days.

(21) Appl. No.: 12/441,970

(22) PCT Filed: Aug. 29, 2007

(86) PCT No.: PCT/EP2007/059009
§ 371 (c)(1),
(2), (4) Date: Oct. 16, 2009

(87) PCT Pub. No.: WO2008/034701
PCT Pub. Date: Mar. 27, 2008

(65) Prior Publication Data
US 2010/0106341 A1  Apr. 29, 2010

(30) Foreign Application Priority Data
Sep. 22, 2006  (DE) .......................... 10 2006 044 837

(51) Int. Cl.
*F27D 1/00* (2006.01)
*G06F 19/00* (2011.01)
(52) U.S. Cl. ......................................... 373/71; 700/209
(58) Field of Classification Search .................. 700/286, 700/291, 295, 209; 373/102, 104, 105, 71, 373/78, 94; 219/121.11, 121.12, 121.16, 219/121.17, 121.37, 121.65
See application file for complete search history.

(56) References Cited

U.S. PATENT DOCUMENTS

| | | | |
|---|---|---|---|
| 4,122,292 A | 10/1978 | Karinsky | 13/2 P |
| 4,161,619 A * | 7/1979 | Markarian et al. | 373/91 |
| 4,463,432 A * | 7/1984 | Carter, II | 700/291 |
| 4,607,374 A * | 8/1986 | Inagaki et al. | 373/104 |
| 4,644,558 A | 2/1987 | Kerr | 373/74 |
| 4,797,897 A * | 1/1989 | Stenzel et al. | 373/105 |
| 5,252,899 A | 10/1993 | Kawamura et al. | 318/568.1 |
| 5,351,267 A * | 9/1994 | Strebel | 373/105 |
| 5,406,581 A * | 4/1995 | Staib et al. | 373/104 |
| 5,410,564 A * | 4/1995 | Takashiba et al. | 373/102 |
| 5,511,223 A | 4/1996 | Scecina et al. | 395/800 |
| 5,809,054 A * | 9/1998 | Oelscher | 373/104 |
| 5,917,115 A * | 6/1999 | Wondris | 75/508 |
| 5,991,327 A * | 11/1999 | Kojori | 373/104 |
| 6,064,687 A * | 5/2000 | Purcell | 373/78 |
| 6,066,825 A * | 5/2000 | Titus et al. | 219/121.36 |
| 6,104,744 A * | 8/2000 | Poppe et al. | 373/102 |
| 6,570,906 B2 * | 5/2003 | Titus | 373/29 |
| 2008/0192796 A1 | 8/2008 | Matschullat et al. | 373/104 |
| 2009/0219968 A1 * | 9/2009 | Perry et al. | 373/104 |

FOREIGN PATENT DOCUMENTS

| | | |
|---|---|---|
| CN | 2522906 Y | 11/2002 |
| DE | 3000996 A1 | 7/1981 |
| DE | 3810354 A1 * | 12/1988 |
| DE | 9402925 U1 | 6/1994 |
| DE | 19945489 A1 | 4/2001 |
| DE | 102004040494 B3 | 7/2005 |
| EP | 0434986 A2 | 7/1991 |
| EP | 0923273 A1 | 6/1999 |
| WO | 2006/021515 A1 | 3/2006 |

* cited by examiner

*Primary Examiner* — Crystal J Barnes-Bullock
(74) *Attorney, Agent, or Firm* — King & Spalding L.L.P.

(57) ABSTRACT

A device for controlling an arc furnace installation has an automatic controller (3) wherein a functional unit (6) for furnace control, a functional unit (7) for electrode control and a functional unit (8) for melting control are integrated in the controller (3).

18 Claims, 1 Drawing Sheet

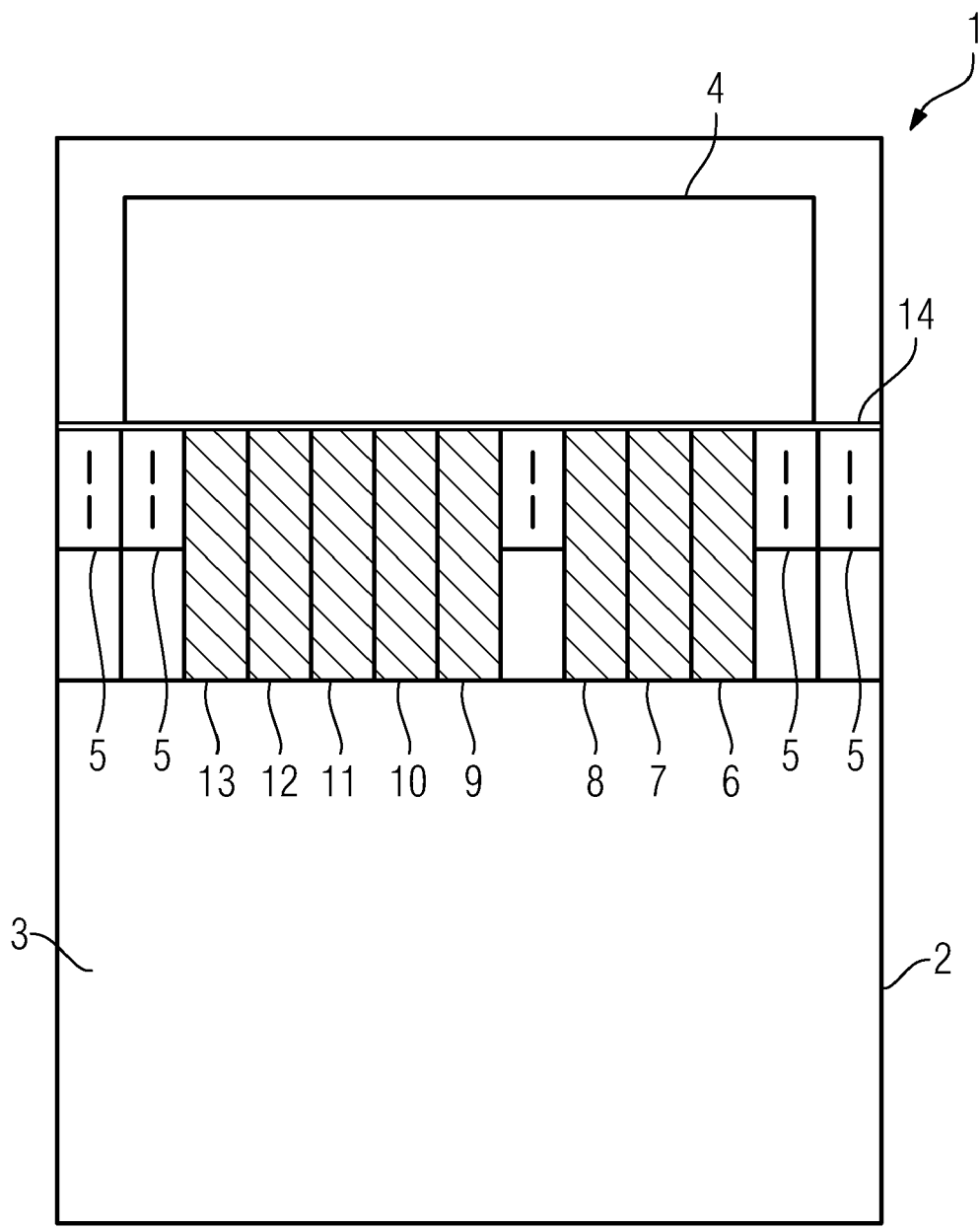

DEVICE FOR CONTROLLING AN ARC FURNACE INSTALLATION

CROSS-REFERENCE TO RELATED APPLICATIONS

This application is a United States national phase filing under 35 U.S.C. §371 of International Application No. PCT/EP2007/059009, filed Aug. 29, 2007 which claims priority to German Patent Application No. 10 2006 044 837.5, filed Sep. 22, 2006. The complete disclosure of the above-identified application is hereby fully incorporated herein by reference.

TECHNICAL FIELD

The invention relates to a device for controlling an arc furnace installation, comprising an automatic controller.

BACKGROUND

Arc furnaces are often used in the steel industry, for example for melting scrap or sponge iron, while it is also possible for other metals to be smelted in an arc furnace. An arc furnace is based on the conversion of electrical energy into thermal energy, using the arc principle. Power outputs of up to 200 MW and more are thereby generated.

An arc furnace may be designed as a DC furnace (generally with one electrode) or as an AC furnace (generally with three electrodes).

A steel processing plant may also comprise a number of such arc furnaces. For example, the actual arc furnace, in which the melting takes place, is often followed by a ladle furnace, which is also designed as an arc furnace. The ladle is the transporting vessel into which the liquid metal is filled from the arc melting furnace. In the ladle furnace, quality-enhancing additives are added, for example, or a further treatment is carried out.

The automation of an arc furnace installation requires many functions to be taken into consideration. The furnace control, for activating the basic functions of the furnace, the electrode control, by means of which the length and power of the arc are ultimately set, and the melting control may be mentioned here by way of example. For all of these functions, a programmable controller is respectively provided. Whenever an arc furnace installation is realized, these programmable controllers must be laboriously tested and adapted to one another each time with respect to interfaces and satisfactory interaction. The associated expenditure on hardware is relatively high and higher expenditure in terms of assembly and initial operation is incurred, since a number of programmable controllers with their own switch cabinets have to be installed.

SUMMARY

According to various embodiments, a device for controlling an arc furnace installation can be provided which is improved in comparison with this.

According to an embodiment, in a device for controlling an arc furnace installation, comprising an automatic controller, a functional unit for furnace control, a functional unit for electrode control and a functional unit for melting control are integrated in the controller. According to a further embodiment, at least one further functional unit, in particular a functional unit for energy optimization and/or a functional unit for foamed slag detection and foamed slag control and/or a functional unit for process optimization and/or a functional unit for controlling the energy supply with regard to specifications of an energy supplier and/or a functional unit for carrying out control individually for a customer, can be integrated in the controller. According to a further embodiment, the device may comprise an assembly unit, in which the functional units are arranged in particular in module locations. According to a further embodiment, the modular functional units can be designed such that they are exchangeable or removable. According to a further embodiment, the controller can be designed for automatically detecting and configuring a functional unit. According to a further embodiment, module locations can be provided for functional units, each model location being assigned a fixed range of performance of a computing device contained in the controller. According to a further embodiment, the functional units can be individually configurable. According to a further embodiment, the functional units can be connected to a bus system. According to a further embodiment, the at least two functional units can be integrated into one functional unit.

BRIEF DESCRIPTION OF THE DRAWINGS

Further advantages and details of the present invention are evident from the exemplary embodiment presented below and by reference to the drawing.

In it, the single FIGURE shows a device 1 according to various embodiments for controlling an arc furnace installation.

DETAILED DESCRIPTION

In the case of a device of the type mentioned at the beginning, it is provided according to various embodiments that a functional unit for furnace control, a functional unit for electrode control and a functional unit for melting control are integrated in the controller.

This means that, on account of the advantageous integration, now only one controller is required for the furnace control, the electrode control and the melting control, and this controller performs the control centrally. There is now no longer any need for laborious interface adaptation and complex matching of the variously acting programming means. The hardware costs are lowered and the expenditure in terms of assembly and initial operation is reduced.

The electrode control is in this case designed for controlling the form and position of the arc. This includes, for example, the activation of the at least one hydraulically movable electrode and the adaptation of the distance from the melting charge.

The furnace control is used to activate general functions of the arc furnace. These comprise, for example, a hydraulically movable furnace cover, the tilting of the furnace, for example when tapping slag created or when decanting the molten metal, as well as the cooling of the oven. This similarly includes measuring instruments and the performance of interventional controlling actions via an operator console, from which an operator can influence the operation of the furnace.

The melting control is ultimately a sequence control. It involves, for example, activating how much energy is required at a particular point in time in order to melt the amount of material that is to be melted at that time. Similarly, it involves determining when, for example, an additive is to be added.

In a further embodiment, at least one further functional unit may be integrated in the controller. Such further functional units may be, for example, a functional unit for energy optimization and/or a functional unit for foamed slag detection and foamed slag control and/or a functional unit for process optimization and/or a functional unit for controlling the energy supply with regard to specifications of an energy supplier and/or a functional unit for carrying out control individually for a customer. Ideally, all these components are integrated in a single automatic controller, so that only this one controller is required. It is then possible to dispense with all other controllers.

A functional unit for energy optimization may, in particular, control the energy optimization via a neural network. Such artificial intelligence allows the energies used to be optimized with respect to consumption, quality and other production parameters.

Foamed slag refers to a layer of slag which floats on the molten metal and is deliberately built up in order that heat does not reach the furnace wall but is absorbed in the foam. To build up further foamed slag, carbon may be added for example. At the same time, the level of the foamed slag is determined, for example, by means of structure-borne sound detectors on the furnace casing. These components elicit a response from the functional unit for foamed slag detection and foamed slag control.

The functional unit for process optimization may, for example, comprise a model computer, which makes optimization of the process also possible in the greater sense. For example, the liquid material may be passed on directly to a continuous casting installation, which stipulates requirements with respect to the amount of processable material.

Controlling the energy supply with regard to specification of an energy supplier may be necessary if, for example, maximum amounts accepted within certain times are envisaged. The corresponding functional unit is used to control, for example, where energy can be saved, which unit can be switched off at the particular time and the like.

Furthermore, a functional unit for carrying out control individually for a customer may be integrated in the controller. Such a functional unit comprises parameters individually envisaged for a customer, which individualize the overall system. However, it is also conceivable that the other functional units are constructed in such a way that they can be adapted to the needs of the customer without any problem, so that individualization can already take place at the other integrated functional units.

The device may expediently comprise an assembly unit, in which the functional units are arranged, in particular in module locations. Such an assembly unit may for example be a switch cabinet in which the controller, which usually comprises a computing device, is accommodated.

In a further embodiment, the functional units of a modular design may be designed such that they can be exchanged or removed. This describes a modular structure which can be adapted as desired. Accordingly, individual functional units can be added or removed in order to adapt the range of functions of the device to individual wishes. Exchanging defective functional units is also a simple matter. Moreover, it is possible without any problem, for example, to replace obsolete functional units with newly developed functional units, so that the device for controlling the arc furnace installation is always up to the latest state.

With such functional units of a modular design there are ultimately two conceivable possibilities as to how and whether a configuration should take place. Firstly, it may be provided that the controller is designed for automatically detecting and configuring a functional unit. A newly introduced functional unit accordingly communicates with the controller, whereby an automatic configuration takes place.

In this case, the functional unit is also assigned suitable ranges of performance, for example processors, memory space and the like.

Alternatively, however, it is also possible that module locations are provided for functional units, each module location being assigned a fixed range of performance of a computing device contained in the controller. In this case, no special configuration is necessary any longer, since each module location, and consequently a functional unit fitted in it, is in any case already assigned ranges of performance, which means, for example, processor performance, memory space, programming means and the like. Such a system is less complicated, but less flexible.

Advantageously, the functional units may be individually configurable. Perfect adaptation to customer wishes is then possible.

For communication with the controller, or the computing device contained in it, the functional units may be connected to a bus system. All types of known bus systems that produce the necessary performance criteria are suitable for this.

In an embodiment, it may also be provided that at least two functional units are integrated into one functional unit. For example, a single functional unit may be provided for the electrode control and the energy optimization. This is always possible whenever the performance criteria of a functional unit make it possible to include a number of such functionalities. This has the effect of saving module locations and of achieving a still more compact construction.

It comprises an assembly unit in the form of a switch cabinet 2, in which an automatic controller 3 is arranged. The automatic controller 3 comprises a computing device 4, which may include one or more processors and one or more memory devices. Furthermore, a plurality of module locations 5 are provided, some of which are occupied by modular functional units 6-13. The functional units 6-13 are designed such that they are removable, in particular exchangeable. They are connected via the module locations 5 to a bus system 14, which couples them to the computing device 4. The functional units 6-13 are individually configurable, so that they can be adapted to specific customer wishes.

In this exemplary embodiment, each module location 5 is assigned a specific range of performance, so that no further configuration is required after a functional unit has been fitted. Alternatively, it is of course also possible that the controller 3 may be designed for automatically detecting and configuring the functional units.

In particular, a functional unit 6 for furnace control, a functional unit 7 for electrode control, a functional unit 8 for melting control, a functional unit 9 for energy optimization, a functional unit 10 for foamed slag detection and foamed slag control, a functional unit 11 for process optimization, a functional unit 12 for controlling the energy supply with regard to specification of an energy supplier and a functional unit 13 for carrying out control individually for a customer may be provided. Apart from the necessary functional units 6-8 for furnace control, electrode control and melting control, the other functional units 9-13 are optional, which means that they do not have to be present to obtain an operational device for controlling an arc furnace installation, or may optionally take the form of a further automatic controller. On account of the modular character, further functional units can be retrofitted without any problem, just as further functional units 9-13 can be removed. The necessarily integrated functional units 6-8 can be exchanged without any problem—for example in the event of a defect or replacement by a more recent model.

In particular, it is also conceivable that two functional units are integrated into one functional unit. For example, it would be conceivable to combine the functional unit 7 for electrode control and the functional unit 9 for energy optimization into a single functional unit. The functional units 7 and 9 could then be removed and replaced by the new functional unit. As a result, fewer functional units are required.

Altogether, the device for controlling an arc furnace installation provides an integrated solution, which is designed to be simple in construction and maintenance, for controlling an arc furnace installation. By being installed in only one switch cabinet, expenditure in terms of production, assembly and initial operation is reduced.

In particular, it is possible in a metal processing plant to provide not only the actual arc furnace for melting but also, for example, a ladle furnace as a further arc furnace. Such a further arc furnace installation can be activated with the same device 1, in which case correspondingly modified parameterization can be used.

The invention claimed is:

1. A device for controlling an arc furnace installation, comprising an automatic controller, wherein a functional unit for furnace control, a functional unit for electrode control and a functional unit for melting control are integrated in the controller;
   wherein the device comprises an assembly unit, in which the functional units are arranged; and
   wherein the functional units are modular such that they are exchangeable or removable.

2. The device according to claim 1, wherein at least one further functional unit is integrated in the controller.

3. The device according to claim 2, wherein the at least one further functional unit is at least one of a functional unit for energy optimization, a functional unit for foamed slag detection and foamed slag control, a functional unit for process optimization, a functional unit for controlling the energy supply with regard to specifications of an energy supplier, and a functional unit for carrying out control individually for a customer.

4. The device according to claim 1, wherein the controller is designed for automatically detecting and configuring a functional unit.

5. The device according to claim 1, wherein module locations are provided for functional units, each module location being assigned a fixed range of performance of a computing device contained in the controller.

6. The device according to claim 1, wherein the functional units are individually configurable.

7. The device according to claim 1, wherein the functional units are connected to a bus system.

8. The device according to claim 1, wherein the at least two functional units are integrated into one functional unit.

9. The device according to claim 1, wherein the functional units are arranged in module locations.

10. A method for providing a device controlling an arc furnace installation, the method comprising:
    providing an automatic controller,
    integrating a functional unit for furnace control, a functional unit for electrode control and a functional unit for melting control in the controller, and
    arranging the functional units in module locations in an assembly unit, wherein the functional units are modular such that they are exchangeable or removable.

11. The method according to claim 10, comprising the step of integrating in the controller at least one of a functional unit for energy optimization, a functional unit for foamed slag detection and foamed slag control, a functional unit for process optimization, a functional unit for controlling the energy supply with regard to specifications of an energy supplier, and a functional unit for carrying out control individually for a customer.

12. The method according to claim 10, comprising the step of designing the controller for automatically detecting and configuring a functional unit.

13. The method according to claim 10, comprising the step of providing module locations for functional units, each module location being assigned a fixed range of performance of a computing device contained in the controller.

14. The method according to claim 10, comprising the step of configuring the functional units individually.

15. The method according to claim 10, comprising the step of connecting the functional units to a bus system.

16. The method according to claim 10, comprising the step of integrating the at least two functional units into one functional unit.

17. A device for controlling an arc furnace installation, comprising:
    an automatic controller, wherein a functional unit for furnace control, a functional unit for electrode control and a functional unit for melting control are integrated in the controller;
    wherein the functional units are connected to a bus system; and
    wherein the functional units are modular such that they are exchangeable or removable from the controller.

18. A method for providing a device controlling an arc furnace installation, the method comprising:
    providing an automatic controller,
    integrating a functional unit for furnace control, a functional unit for electrode control and a functional unit for melting control in the controller, and
    connecting the functional units to a bus system,
    wherein the functional units are modular such that they are exchangeable or removable from the controller.

* * * * *